United States Patent [19]

Dunk

[11] 4,037,229
[45] July 19, 1977

[54] ANTENNA MOUNT

[76] Inventor: Thomas H. Dunk, 2470 Hunter Road, Brighton, Mich. 48116

[21] Appl. No.: 656,647

[22] Filed: Feb. 9, 1976

[51] Int. Cl.² ............................................. H01Q 1/32
[52] U.S. Cl. ..................................... 343/715; 343/882
[58] Field of Search ............... 343/702, 711, 712, 713, 343/715, 805, 882

[56] References Cited

U.S. PATENT DOCUMENTS

| | | | |
|---|---|---|---|
| 3,241,144 | 3/1966 | Berger | 343/702 |
| 3,369,247 | 2/1968 | Bacow | 343/715 |
| 3,408,652 | 10/1968 | Allisbaugh | 343/715 |

Primary Examiner—Eli Lieberman
Attorney, Agent, or Firm—Arnold S. Weintraub

[57] ABSTRACT

A device for mounting an antenna or the like has a base plate, a top plate detachably connectable to the base plate and a swiveling or rotatable antenna-receiving member. The member is securely retained between the base plate and top plate. The present device is particularly efficacious in mounting a citizen's band radio antenna to the trunk lid of an automobile.

7 Claims, 3 Drawing Figures

ANTENNA MOUNT

BACKGROUND OF THE INVENTION

1. Field of the Invention

The present invention pertains to antennas. More particularly, the present invention concerns devices for mounting antennas on a support. Even more particularly, the present invention concerns a detachable assembleable device for mounting an antenna on a support and which permits proper orientation of the antenna.

2. Prior Art

The use of citizen's band radios has been one of the most rapidly emerging and growing trends in present day communications systems. Citizen's band (CB) radios are employed in households, offices and in an ever-increasing number of vehicles. Heretofore, vehicle installation has, usually, been reserved for trucks and similar type vehicles. However, because of the emergence of this industry an everincreasing number of automobiles now are having such radios installed.

As is known to those skilled in the art to which the invention pertains, in order to achieve proper reception on CB transceivers, proper antennas, i.e. coaxial antennas, must be utilized. Furthermore, such antennas must have a substantially vertical orientation. This has created a problem with respect to antenna mounting on automobiles. Conventionally, coaxial antennas are mounted on automobile trunk lids in a fixed position. Because of modern day automobile designs the proper orientation of a coaxial antenna on a trunk lid is virtually impossible due to the curvatures imparted to the trunk lids. This is especially true with respect to "fastback" automobiles.

As will subsequently become apparent, the present invention provides a salient solution to this problem by providing an antenna mount which permits the proper orientation of a coaxial antenna. It is to be appreciated that heretofore the art has been concerned solely with new coaxial antennas and not the mounting devices therefor. The antenna mount of the present invention is adaptable to all such prior art antennas.

SUMMARY OF THE INVENTION

In accordance with the present invention there is provided a device for mounting an antenna on a fixed support. The device hereof, generally, comprises a bottom plate, a top plate and a rotatable antenna-receiving member.

The bottom plate includes means for detachably connecting the device to a support. The top plate overlies the bottom plate and is detachably connectable hereto. The antenna-receiving means is securely retained between the bottom and top plates. The bottom and top plates are configured to retain the antenna-receiving means while permitting such means to be substantially universally rotatable or swivelable to permit proper orientation of an antenna connected thereto.

In a preferred embodiment of the invention, a notch is formed in the bottom plate which receives and guides the coaxial cable. Furthermore, the cable ground wire is connectable to the means which renders the top plate detachably connected to the bottom plate.

The present invention is particularly adapted for mounting a citizen's band antenna on the trunk lid of an automobile.

For a more complete understanding of the present invention reference is made to the following detailed description and accompanying drawing. In the drawing like reference characters refer to like parts throughout the several views in which:

DETAILED DESCRIPTION OF THE PREFERRED EMBODIMENT

Figure 1:
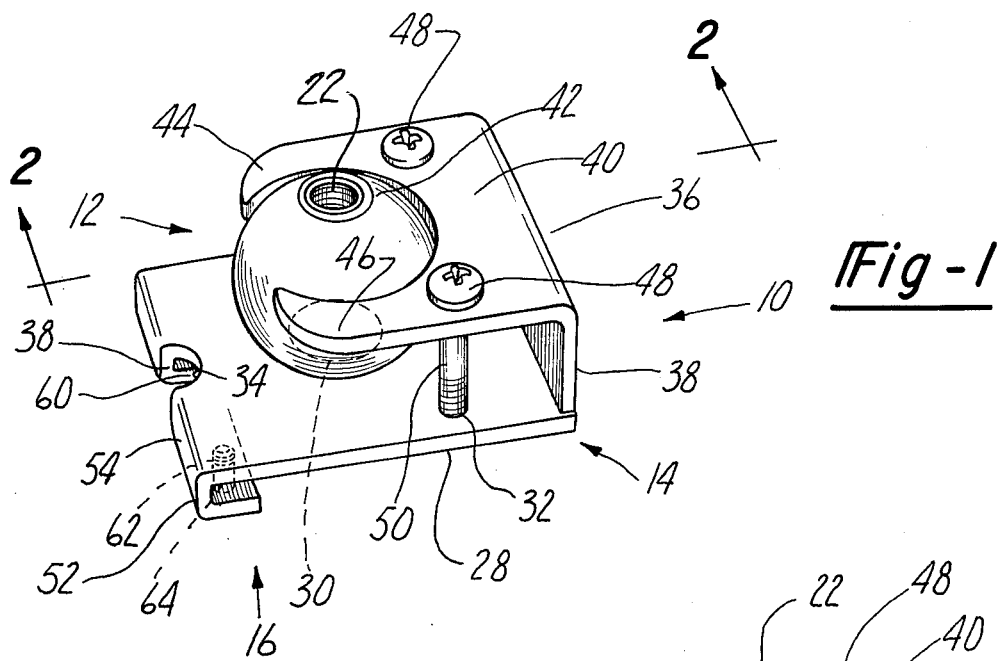
FIG. 1 is a perspective view of the device of the present invention.

Now, and with reference to the drawing, there is depicted therein a device for mounting an antenna in accordance with the present invention, and, generally, denoted at 10. The device or antenna mount 10 comprises means 12 for receiving an antenna and means 14 for retaining the antenna-receiving means 12. The retaining means 14 includes means 16 for mounting the device to a support.

Figure 3:
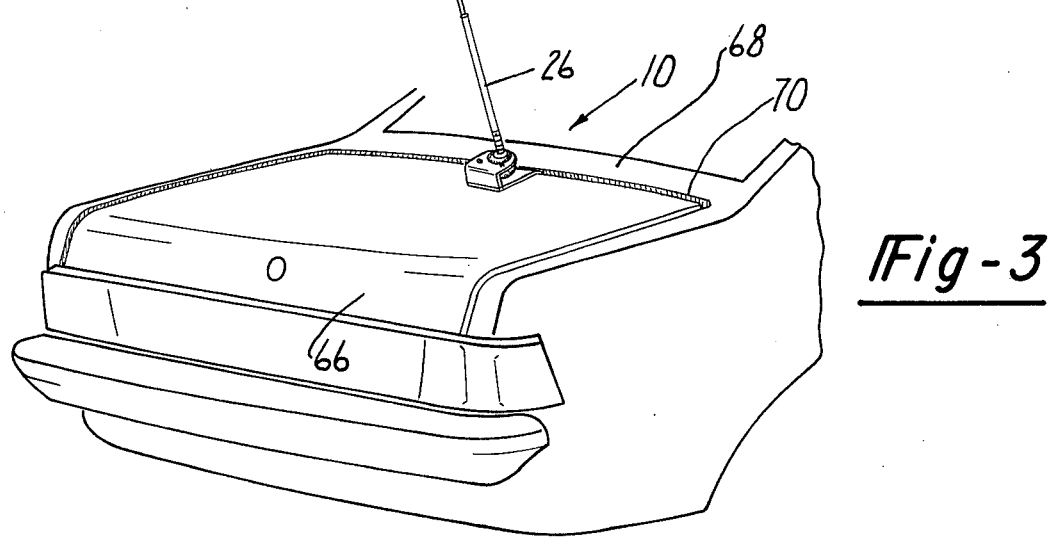
FIG. 3 is a perspective view depicting the deployment of the device of the present invention.

With more particularity, the means 12 for receiving the antenna comprises a substantially spherical member 18. Although other configurations can be utilized, a spheroid is preferred. The member 18 is formed from a non-electricity conducting material, such as a rigid plastic or the like. Suitable materials include polypropylene, bakelite, ceramic materials and the like. It is to be understood, however, that any non-conducting material can be used to form the member 18. A radial bore 20 is formed in the member 18 and extends from the periphery thereof to substantially the center of the member. An internally threaded conduit or fitting 22 is securely fitted in the bore 20. The conduit has a closed end 24. The conduit or fitting 22 is disposed in the bore by press fitting or the like. The conduit is formed from an electrically conductive material, such as any suitable metal including copper, brass, aluminum or the like. The means 12 is adapted to threadably receive an antenna 26 by threadably connecting the antenna to the conduit (FIG. 3).

Figure 2:
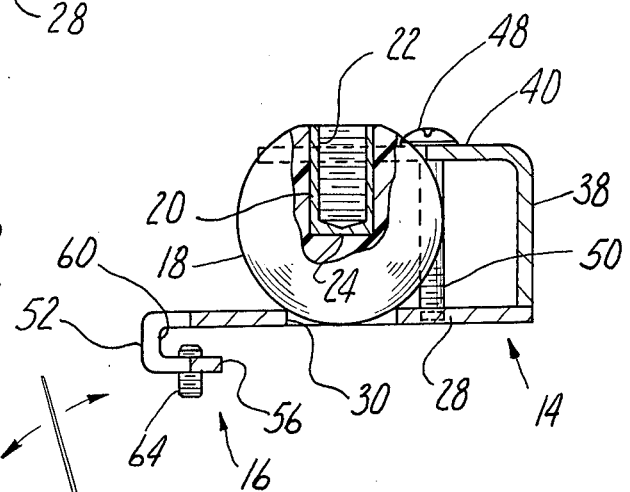
FIG. 2 is a cross-sectional view of the device taken along the line 2—2 of FIG. 1.

The means 12 is retained in a substantially universally rotatable position via the means 14. The means 14 comprises a bottom plate or base 28. The base 28 is a substantially planar plate having a central aperture 30 formed therethrough. The aperture 30 has a diameter less than that of the member 18. In this manner a portion of the member 18 projects or protrudes into the void created by the aperture, as shown in FIG. 2. Thus, the aperture 30 defines a seat for the member 18 whereby the member 18 is substantially universally rotatably or swivelably seated therewithin. The base 28 is further provided with a pair of spaced apart apertures 32. The apertures 32 are aligned with one on each side of the aperture 30. As will subsequently be described the apertures threadably receive fastening means which cooperate with the means 14 to lock the means 12 in position.

The base 28 is, also, provided with a cut-out section or notch 34. The notch 34 serves as a seat for a coaxial cable leading to the antenna 26 and to ground. The mode by which the seating is realized will be discussed subsequently.

Referring, again, to the drawing, the means 14 further comprises a top member 36. The member 36 comprises an L-shaped plate having first and second legs 38, 40, respectively. The free edge of leg 38 seats against and abuts one end of the base 28, as shown. The other leg 40 is substantially perpendicular to the leg 38 and is parallel to and spaced apart from the base 28.

The free end of the leg 40 is provided with an arcuate cut-out section 42. The cut-out section 42 engages the periphery of the antenna-receiving means 12, to hold the means 12 in position. The portion of the leg 40 about the cut-out section 42 defines a pair of opposed jaws 44 and 46. The cooperation between the jaws 44 and 46 and the cut-out section 42 permit a major amount of the periphery of the means 12 to be encircled.

The leg 40, also, is provided with a pair of spaced apart apertures 48. One of the apertures 48 is in registry with one of the apertures 32. The other aperture 48 is in registry with the other aperture 32. Insertable into each pair of registering apertures 32, 48 is a means for fastening the plates 28 and 36 together, such as threaded fasteners 50. The threaded fasteners 50 securely interconnect the plates 28 and 36. Contemporaneously, by interconnecting the two plates a compressive force is exerted on the means 12 to securely retain the means 12 in a fixed position.

It is to be appreciated that the universal rotation of the means 12 is solely limited by the abutment thereof against the edge of the cut-out section 42 and the locking in position of the two plates by the fastening means 50.

As hereinbefore noted, and as clearly shown in FIGS. 1 and 2, the present invention further comprises means 16 for mounting the device 10 onto a support. The means 16 comprises an L-shaped member 52 which is integrally formed with the notched edge of the base 28. The L-shaped member 52 has a first leg 54 downwardly depending from the notched edge of the base. The second leg 56 of the member 52 is perpendicular to the first leg 54 and extends inwardly toward the center of the base 28.

The member 52 is provided with a groove 58 which is continuous with notch 34. An aperture 60 is formed through the groove 58. The aperture 60 is formed through the first leg 54 of the mounting means 52.

The second leg 56 of the mounting means 16 has at least one aperture 62 formed therethrough. The aperture 62 receives a threaded fastener or the like 64.

In utilizing the mounting means 16, the edge of the support is inserted into the space defined between the lower surface of the base 28 and the upper surface of the leg 56. The threaded fasteners 62, then, are tightened to securely mount the device to a support.

Referring now to FIG. 3, there is depicted a preferred utilization of the present invention. As shown in FIG. 3, there is depicted a vehicle trunk lid 66. The lid 66 is hingedly connected to the rear window deck 68, in the well known manner. The device 10 is mounted to the trunk lid by securing the mounting means 16 to the lid 66. This is achieved by engaging the leg 56 with the undersurface of the trunk lid such that the edge of the lid is seated in the space between the bottom surface of the base and the upper surface of the leg 56. Access to the edge of the trunk lid is afforded by the gap 70 between the lid 66 and the deck 68.

The antenna is threadably connected to the means 12 via the conduit 22. The means 12 is then rotated to orient the antenna to an upright or vertical position. The fasteners 50 are, then, tightened to clamp the means 12 in position. Adjustments are available by rotation of the means 12 to ensure the proper orientation by slightly loosening the fasteners 50. They are then tightened to lock the means 12 in position. With respect to a CB antenna, the coaxial cable is nested in the groove 58. The ground wire can be extended through the aperture 60 or otherwise be connected to one of the fasteners 50. The lead wire is connected to the antenna which is still conductive by virtue of the metallic nature of the conduit.

It is to be appreciated that no matter what the curvature of the support is, the proper orientation of the antenna is achieved by rotation of the means 12.

It should further be noted with respect hereto that the means 12 can have an arc of about 110° from the front to the rear of the mounting device, and about an arc of 50° from side to side, by virtue of the design of the top member. Furthermore, it should be noted that the means 12 has a diameter greater than the height of the retaining means 14 to permit facilitating the rotation thereof and the mounting of an antenna.

Alternatively, and in accordance herewith, it is possible to manufacture the present mount such that the means 12 is electrically conductive and the means 14 is non-conductive. The means 12 would be formed from a conductive material, such as a metal. The retaining means would, then, be formed from a non-conductive material, such as nylon or other suitable material. By insulating the means 12 from the means 14 grounding out of an antenna connected thereto would be obviated.

Having, thus, described the invention what is claimed is:

1. An antenna mount, comprising:
   a. means for receiving an antenna,
   b. means for securely retaining the antenna-receiving means, the retaining means comprising:
      1. a base plate, the base plate having a seat defined therein for seatingly receiving a portion of the antenna-receiving means,
      2. a top member spaced apart from the base plate and being substantially parallel thereto, the top member having a C-shaped cut-out section which engages the periphery of another portion of the antenna-receiving means to hold the antenna-receiving means in position, and
      3. means for detachably interconnecting the base plate and the top member comprising a sidewall integral with the top member and abutting the base plate with adjustable fastening means spaced from said sidewall, and
   wherein the antenna-receiving means is rotatable while retained by the retaining means, to permit proper orientation of an antenna.

2. The antenna mount of claim 1 which further comprises:
   means for mounting the antenna mount to a support, the means for mounting being connected to the means for retaining.

3. The antenna mount of claim 1 wherein:
   the base plate has a central aperture formed therethrough, the aperture defining the seat.

4. The antenna mount of claim 1 wherein the antenna-receiving means comprises:
   a spherical member having a radial bore formed therein, and
   a metallic conduit, disposed in the bore, the conduit having an internally threaded profile for threadably receiving an antenna.

5. The antenna mount of claim 2 wherein the means for mounting is connected to the base at one edge thereof.

6. The antenna mount of claim 1 wherein:
the means for interconnecting the base and the top member, exerts a compressive force on the antenna-receiving means to retain it in position.

7. The antenna mount of claim 5 wherein:
a continuous groove is provided which extends between the base and the mounting means, the groove being adapted to nest an antenna cable therewithin.

* * * * *